United States Patent Office 3,123,050
Patented Mar. 3, 1964

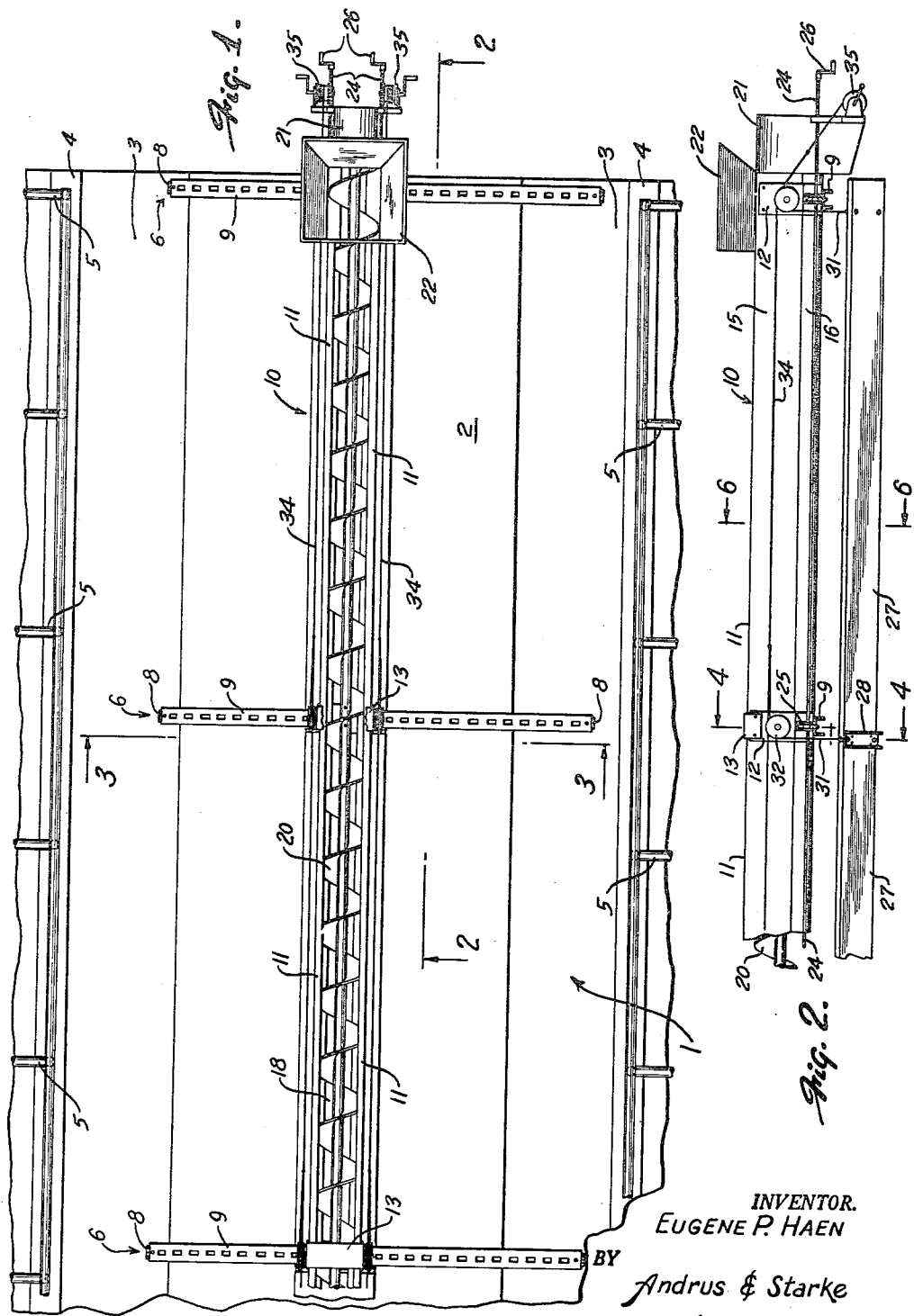

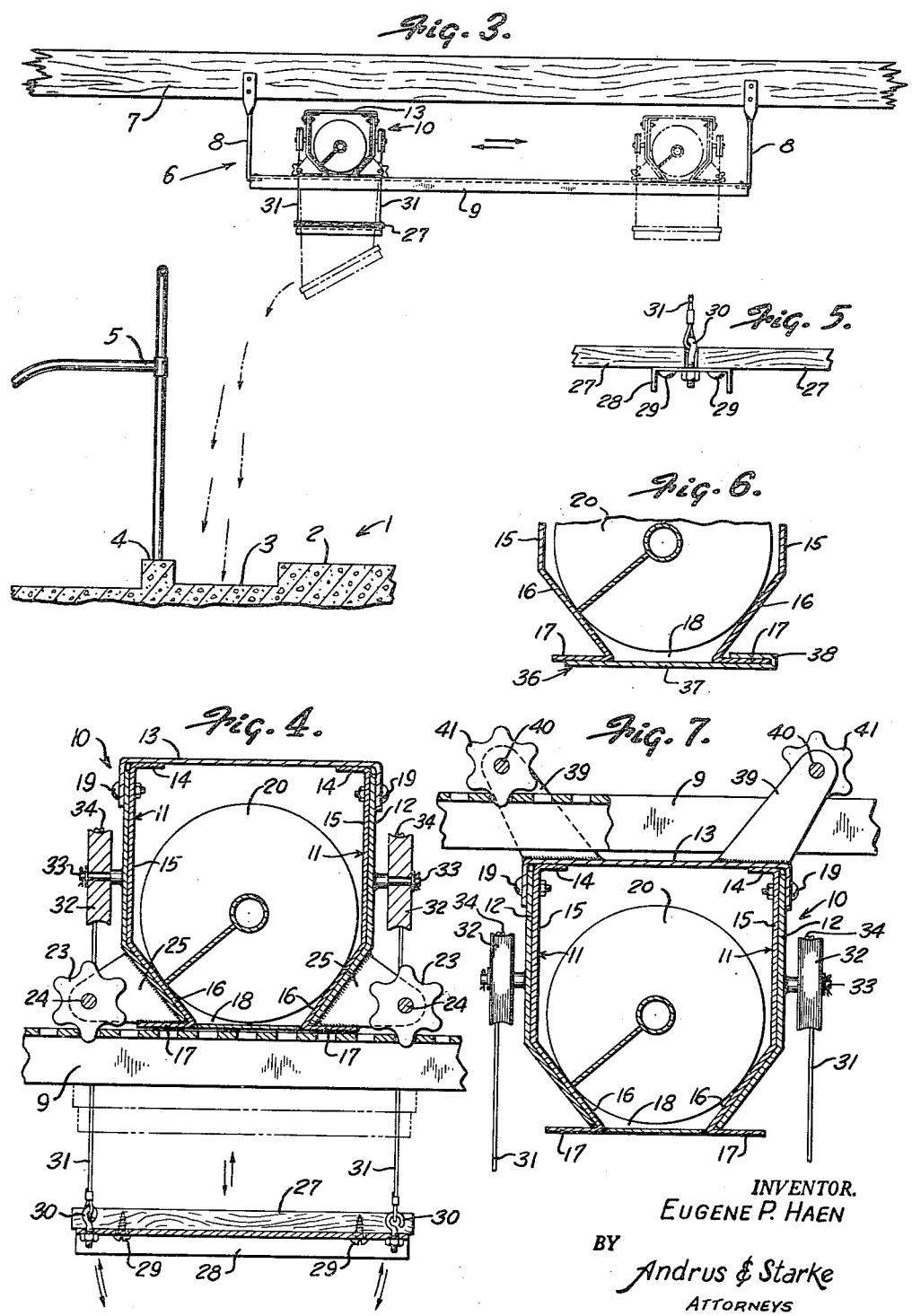

3,123,050
LIVESTOCK FEEDING APPARATUS
Eugene P. Haen, Kaukauna, Wis., assignor to Badger Northland, Inc., Kaukauna, Wis., a corporation of Wisconsin
Filed Apr. 18, 1962, Ser. No. 188,344
7 Claims. (Cl. 119—52)

This invention relates to a livestock feeding apparatus and more particularly to an apparatus for feeding livestock which employs a traversing feed conveyor unit.

A dairy cattle barn normally is constructed with a feed alley or walkway with stanchions for the cattle located on the side of the feed alley and a feed trough positioned between the alley and the stanchion area. In the usual dairy cattle operation, the feed is brought in along the feed alley in a wagon or the like and is manually thrown into the feed trough where the cattle can feed on the same. This operation of distributing the feed to the cattle requires considerable time and with the high cost of farm labor, often involves a substantial expense to the farmer.

The present invention is directed to a livestock feeder which is adapted to distribute feed to livestock in a barn or other structure. According to the invention, the feeder includes a frame which is suspended from the ceiling beams of the barn or otherwise supported above the feed alley. The frame includes a series of spaced guide rails which extend transversely over the feed alley, and a conveyor, which extends the entire length of the feed alley, is mounted for movement on the guide rails.

The feed is introduced to the conveyor through a hopper at one end of the conveyor and the bottom of the conveyor is provided with an opening which extends substantially the entire length of the conveyor so that the feed is distributed through the bottom opening as the conveyor is operated.

According to the invention, the conveyor unit can be moved over the guide rails transversely of the feed alley from a non-operating position to a position over the feed trough so that the feed can be distributed in the trough.

To direct the discharge of feed, a baffle is supported by a series of cables and is located below the discharge opening in the conveyor. The baffle can be raised and lowered and can also be tilted about a longitudinal axis to direct the discharge of feed as desired.

With the use of a single traversing conveyor and the baffle arrangement, the feed can be automatically distributed to the feed trough. In addition, the amount of feed discharged can be varied by raising or lowering the baffle, and the pattern of distribution can be varied by tilting the baffle.

Other objects and advantages will appear in the course of the following description.

The drawings illustrate the best mode presently contemplated in carrying out the invention.

In the drawings:

FIG. 1 is a fragmentary plan view of the feeding apparatus of the invention as assembled in a barn;

FIG. 2 is a longitudinal section taken along line 2—2 of FIG. 1;

FIG. 3 is a transverse section taken along line 3—3 of FIG. 1;

FIG. 4 is a transverse section taken along line 4—4 of FIG. 2;

FIG. 5 is an enlarged fragmentary view showing the connection of the adjacent ends of the baffle boards;

FIG. 6 is a transverse section taken along line 6—6 of FIG. 2 and showing the removable closure for the conveyor housing opening; and FIG. 7 is a view similar to FIG. 4 showing a modified form of the invention.

The drawings illustrate a livestock feeding apparatus for automatically distributing feed to cattle or other livestock which are housed in a barn or other structure. The barn includes a foundation 1 having a raised central feed alley 2 and a pair of feed troughs 3 which are located adjacent the feed alley. Curbs 4 are located laterally outward of the feed troughs and support the stanchion frames 5 for the cattle or livestock to be fed.

The feeding apparatus comprises a frame 6 which is supported from the ceiling beams 7 of the barn or other structure. The frame 6 includes a series of vertical supports 8 secured to beams 7 and the supports 8 carry a series of spaced horizontal guide rails 9. The rails 9 are channel shaped and the web is provided with a series of spaced openings which extend substantially the length of the rails 9.

A conveyor unit 10 extends substantially the entire length of the feed alley 2 and is mounted for movement on the horizontal rails 9. The conveyor unit 10 includes a series of generally U-shaped conveyor sections 11 which are connected in an end-to-end relation by straps 12 and 13. As best shown in FIG. 4, each conveyor section 11 is formed of a pair of separate side walls, and each side wall includes an upper inwardly extending flange 14 and a vertical section 15. In addition, a diagonal section 16 extends downwardly from each vertical section 15 and terminates in a horizontal surface or flange 17 which extends laterally outwardly from the lower edge of the diagonal section 16.

The lower extremities of the diagonal sections 16 of the conveyor sections 11 are spaced apart to provide a slot 18 or opening which extends substantially the entire length of the conveyor unit 10.

The generally U-shaped straps 12, which connect the conveyor sections 11 together, extend downwardly along the outer surfaces of the diagonal sections 16 and across the slot 18. The horizontal surfaces 17 are notched to receive the straps 12. Except for the straps 12 which cross the slot 18, the slot is continuous from one end of the conveyor to the other. The upper straps 13 extend across the open top of the conveyor housing 11 and both straps 12 and 13 are connected to vertical sections 15 by bolts 19.

As best shown in FIG. 4, an auger 20 is located within the conveyor sections 11 and is supported on diagonal sections 16. The auger is driven by a mechanism located within housing 21 and serves to convey the feed within the housing sections 11. Feed is supplied to the conveyor auger 20 by a hopper 22 which is preferably connected to one end of the conveyor unit. To move the conveyor unit 10 transversely of the feed alley 2 on the rails 9, a pair of gears 23 are secured to each strap 12 and the teeth of the gears engage the openings in the horizontal rails 9 and support the conveyor unit. Each gear 23 is secured to a shaft 24 which extends longitudinally of the conveyor unit and the shafts 24 are journalled within brackets 25 extending outwardly from the straps 12. The shafts 24 extend to the end of the conveyor unit 10 and the end of one of the shafts 24 is provided with handle or crank 26. By turning the crank 26, the corresponding shaft 24 can be rotated to drive the gears 23 and move the conveyor unit 10 over the rails 9. As best shown in FIG. 3, the conveyor unit can be moved from a position over one side edge of the feed alley to a position above the opposite side edge of the feed alley.

While the traversing mechanism is shown to be manually operated, it can be power driven if desired. Similarly, other drive mechanisms can be substituted for the drive gears 23 to move the conveyor unit 10 over the rails 9.

To direct the feed to the feed troughs 3, a series of baffle boards 27 are located in an end-to-end relation beneath the slot 18 in the conveyor sections 11. The adjacent ends of the baffle boards 27 are supported by channel members 28 and screws 29 secure the boards 27 to the channel members 28.

The baffle boards 27 are suspended by I-bolts 30 which are connected to the web of each channel 28 between the opposed ends of the boards 27, and cables 31 are secured to the I-bolts 30. The cables 31 extend upwardly over pulleys 32 which are mounted for rotation on shafts 33 secured to the straps 12. Each of the cables 31 is spliced to a longitudinally extending cable 34, and one end of each of the longitudinal cables 34 is trained about a winch 35 connected to the housing 21. By operating one of the winches 35, the corresponding side edges of the boards 27 can be raised or lowered to thereby tilt the boards about a longitudinal axis. By operating both of the winches 35, the boards 27 can be raised and lowered without tilting the same. Thus, the winches 35, along with the cables 31 and 34 not only raise and lower the boards with respect to the conveyor unit 10, but also serve as a means for tilting the boards, as best shown in FIG. 3, so that the feed can be directed to either of the feed troughs 3.

In operation of the feeder, the feed is initially introduced into the hopper 22 and is conveyed through the conveyor sections 11 by the auger 20. The quantity of feed being discharged through the slot 18 can be regulated or metered by raising and lowering the baffle boards 27. If the boards 27 are at an upper position adjacent the rails 9, the space between the slot 18 and boards 27 will be readily filled with feed and a substantial amount of feed will then be carried on by the conveyor and a smaller quantity of feed will be discharged to the troughs 3. Conversely, if the boards are at a lower position, considerably below the rails 9, a larger quantity of feed will be discharged through the slot 18 to the troughs 3 and a smaller quantity will be carried on by the conveyor. In addition, the boards can be tilted about the longitudinal axis in order to direct the feed into the desired feed trough 3, as best shown in FIG. 3.

A provision is also made for partially or fully enclosing the slot 18 in the bottom of the conveyor unit to vary the distribution of feed along the length of the conveyor unit. As shown in FIG. 6, a closure plate 36 is removably attached to the horizontal section 17 of the conveyor unit and includes a flat portion 37, which extends across the slot 18 to close the same so that feed will not be discharged at that particular area, and a reverse bent portion 38 which is engaged with the horizontal section 17 and retains the plate 36 in position.

The plates 36 can extend the entire length of each conveyor housing 11 to enclose the slot 18 between straps 12 or the plates can be made in shorter lengths so that each individual plate will enclose only a portion of the length of the slot between adjacent straps. The plates 36 are adapted to be used when it is desired not to feed to a particular length of the feed trough, as for example when one or more stanchions are not occupied. By inserting the plates 36 throughout the entire length of the conveyor unit, the entire length of the slot will be closed off and the conveyor unit will then function as a closed conveyor and merely convey feed to the end of the unit without discharging feed along its length.

If desired, the width of the flat portion 37 of plates 36 can be decreased so that the portion 37 extends only partially across the slot and thereby restricts the flow of feed to a particular length of the feed trough rather than cutting off the supply completely. For example, it may be desired to supply less feed to certain animals at various locations along the length of the feed trough. By proper placement of plates 36, which partially close off the slot 18, the flow of feed at these locations can be restricted.

While the plates 36 are shown connected to the conveyor housing 11 by the reverse bend 38, the closure plates can be attached in any desired manner.

FIG. 7 shows a modified form of the invention in which the conveyor unit 10 is suspended from the guide rails 9. In this embodiment, a pair of lugs 39 are welded or otherwise secured to each strap 13 of conveyor unit 10 and shafts 40, corresponding to shafts 24 of the first embodiment, are journalled within the lugs 39 and carry gears 41, similar to gears 23. The teeth of gears 41 mesh with the openings in the guide rail 9, and the conveyor unit is thus supported and driven by the gears.

The shafts 40 and gears 41 are driven to move the conveyor unit 10 transversely of the feed trough 3 by a mechanism similar to that described in connection with the first embodiment.

Alternately, the lugs 39 may carry wheels or rollers which ride on elevated guide rails or tracks and a separate drive mechanism may be employed to move the conveyor unit along the guide rails or track.

In this embodiment, baffle boards 27 are suspended from cables 31 which are trained over pulleys 32 as in the structure shown in FIGS. 1–6. However, as the guide rails 9 are located above the conveyor unit, the boards 27 can be raised into contact with the conveyor sections 11 to close off the slot 18. With the boards 27 up against the conveyor sections 11, the feed will be conveyed directly through the sections and the unit will function as a conventional closed conveyor.

The present invention provides an automatic feeding apparatus which uses a single, traversing conveyor unit and baffle arrangement to distribute feed to a feed area. Moreover, a provision is made for varying the amount of feed which is discharged and also for varying the direction of discharge of the feed to obtain any desired feed pattern.

While the above description is directed to the use of the feeder in a barn or other structure, it is contemplated that the feeder can also be used in a feed yard in which case the conveyor unit would be mounted above the feed area on a suitable framework, rather than being suspended from the ceiling of the barn, as described above. Moreover, the feeder can be used with a series of parallel feed areas and the conveyor unit can be moved transversely from one feed alley to another as desired, or the feeder can be used with a single feed trough or feed area in which case the conveyor unit can be moved to a position over the feed area during feeding periods, and moved to a storage position during non-feeding periods.

Various modes of carrying out the invention are contemplated as being within the scope of the following claims particularly pointing out and distinctly claiming the subject matter which is regarded as the invention.

I claim:

1. A livestock feeding apparatus for distributing feed to a feed area comprising,
    (a) a frame including a series of guide members located substantially above the feed area and extending transversely of said feed area,
    (b) feed conveyor means mounted for movement on the guide members and having a feed discharge opening in the bottom thereof and extending a substantial length of said feed conveying means,
    (c) means for moving said feed conveyor means on the guide members transversely of the length of said feed conveyor means,
    (d) a closure member removably attached to said feed conveyor means and disposed across said feed discharge opening to selectively restrict the flow of feed from said discharge opening, and
    (e) feed deflecting means located beneath the feed conveyor means and separate from said closure member for deflecting the feed to a given location in the feed area.

2. A livestock feeding apparatus for distributing feed to a feed area comprising,
    (a) a frame located above the feed area and in spaced relation thereto,
    (b) a conveyor housing including a plurality of housing sections disposed in an end-to-end relation with each section comprising two separate halves with the bottom edges of the halves being spaced apart to define an opening,
(c) a strap disposed around the adjacent ends of the sections to join said sections together, said strap extending beneath said sections and across said opening.
(d) a conveyor disposed within said conveyor housing and adapted to convey feed therethrough with said feed being discharged through the opening in said housing sections, and
(e) a closure member attached to the conveyor housing and adapted to at least partially close off a portion of the length of said opening to thereby restrict the flow of feed at said portion.

3. A livestock feeding apparatus for distributing feed to a feed area comprising,
  (a) a frame including a series of guide members located above the feed area and extending transversely of said feed area,
  (b) feed conveying means having a feed discharge opening in the bottom thereof extending a substantial length of said feed conveying means,
  (c) means for suspending said feed conveying means from the guide members,
  (d) means for moving said feed conveying means on said guide members transversely of the length of said feed conveying means,
  (e) a feed distribution member disposed beneath the opening in said conveying means and located a substantial distance above said feed area, and
  (f) means for moving said feed distribution member from a conveying position in which said member encloses said opening and feed will be conveyed directly through said feed conveying means, to a feeding position spaced below said opening in which feed will be distributed through said opening to the feed area.

4. A livestock feeding apparatus for distributing feed to a feeding area, comprising,
  (a) a frame located above the feed area in spaced relation thereto, said frame including a series of guide members extending transversely of said feed area with said guide members having a series of spaced openings therein,
  (b) a conveyor housing extending longitudinally of the feed area and having an opening in the bottom thereof,
  (c) a conveyor disposed within said conveyor housing and adapted to convey feed therethrough with the feed being discharged through the opening in the conveyor housing,
  (d) a bracket secured to the conveyor housing and extending outwardly therefrom,
  (e) a gear mounted for rotation on said bracket and engaged with the openings in said guide members, and
  (f) means for driving the gear to thereby move the conveyor housing along the guide members transversely of the length of the feed area.

5. A livestock feeding apparatus for distributing the feed to a feed area comprising,
  (a) a frame located above the feed area in spaced relation thereto said frame including a series of guide members extending transversely of the feed area with said guide members having a series of spaced openings therein.
  (b) a conveyor housing including a plurality of housing sections disposed in end-to-end relation with each section having an opening in the bottom thereof extending substantially the length of the section,
  (c) a strap disposed around adjacent ends of the sections to join the sections together, said strap extending beneath said sections and across said opening.
  (d) a conveyor disposed within the conveyor housing and adapted to convey feed therethrough with the feed being discharged through the opening in the housing sections,
  (e) a shaft journalled in said straps and extending longitudinally of said housing,
  (f) a gear member mounted on said shaft and engaged with the openings in the guide member, and
  (g) means for rotating the shaft to thereby move the conveyor housing along the guide members transversely of the length of the feed area.

6. A livestock feeding apparatus for distributing feed to a pair of feed troughs separated by a central raised alley comprising,
  (a) a frame including a series of guide members located substantially above the alley and extending transversely of said alley and feed troughs,
  (b) feed conveying means mounted for movement on the guide members and having a feed discharge opening therein extending a substantial length of the feed conveying means,
  (c) means for moving said feed conveyor means on said guide members transversely of the length of the conveyor means to thereby selectively shift the feed conveyor means from a position substantially above one of said feed troughs to a position substantially above the other of said feed troughs,
  (d) a baffle board disposed beneath the opening in said feed conveyor means,
  (e) a series of flexible members connecting each side edge portion of said baffle board with said feed conveyor means,
  (f) a series of pulleys mounted on each side of the feed conveying means, each of said pulleys being rotatably mounted above a transverse horizontal axis and the flexible members being trained over the respective pulleys, and
  (g) a pair of cables extending longitudinally along each side of the feed conveying means, each of said flexible members on one side of the feed conveying means being connected to the corresponding cable, each side edge of said baffle board being raised and lowered by actuation of the respective cable.

7. A livestock feeding apparatus for distributing feed to a feed area comprising,
  (a) a frame including a series of guide members located above the feed area and extending transversely of said feed area,
  (b) a conveyor housing mounted for movement on the guide members and having a feed discharge opening extending a substantial length of the housing,
  (c) conveying means for conveying feed within the housing,
  (d) a flange extending laterally outward from the conveyor housing on each side of the opening therein, said flanges being disposed in a horizontal plane and adapted to ride on said guide members, and
  (e) drive means operably connected to said conveyor housing for moving the housing on said guide members transversely the length of the conveyor means to thereby shift the conveyor housing from a position substantially above the feed area to a remote position.

References Cited in the file of this patent
UNITED STATES PATENTS 2,970,568  Johnson _____ Feb. 7, 1961
3,029,925  Martin et al. _____ Apr. 17, 1962